United States Patent [19]

Gargas

[11] Patent Number: 4,684,334
[45] Date of Patent: Aug. 4, 1987

[54] INLET VALVE ASSEMBLY FOR PAINT SPRAYER

[75] Inventor: Eugene F. Gargas, Wellington, Ohio

[73] Assignee: The Wooster Brush Company, Wooster, Ohio

[21] Appl. No.: 897,585

[22] Filed: Aug. 18, 1986

[51] Int. Cl.[4] .............................................. F16K 15/04
[52] U.S. Cl. .................................. 417/568; 137/512.3; 137/533.13; 137/904; 417/563
[58] Field of Search ................ 137/512, 512.3, 533.11, 137/533.13, 533.15, 904; 417/454, 455, 568, 567

[56] References Cited

U.S. PATENT DOCUMENTS

| | | | |
|---|---|---|---|
| 1,642,724 | 9/1927 | Fleming | 137/533.13 |
| 1,779,322 | 10/1930 | Leidecker | 137/904 X |
| 3,806,285 | 4/1974 | Sech | 417/568 |

*Primary Examiner*—Robert G. Nilson
*Attorney, Agent, or Firm*—Renner, Otto, Boisselle & Lyon

[57] ABSTRACT

Inlet valve assembly for a paint prayer and the like includes an adjustable inlet valve stop movable toward and away from an inlet valve seat to reduce or increase the amount of free movement of the inlet valve for obtaining optimum volumetric efficiency by reducing the back flow through the inlet valve. The adjustable stop includes a rebound spring and a holder therefor which is threadedly mounted, whereby rotation of the holder in opposite directions varies the initial clearance space between the spring and inlet valve when the inlet valve is closed. The holder has a non-circular opening in the center to enable the user to insert a turning wrench or the like therein to turn the holder to the desired adjusted position. Access to the adjustable stop for turning the holder may be obtained by inserting the tool through an outlet valve opening in the sprayer pump upon removal of an outlet valve assembly therefrom. A conical lock spring may be used to frictionally lock the holder in the desired adjusted position.

17 Claims, 4 Drawing Figures

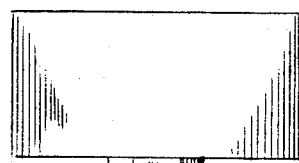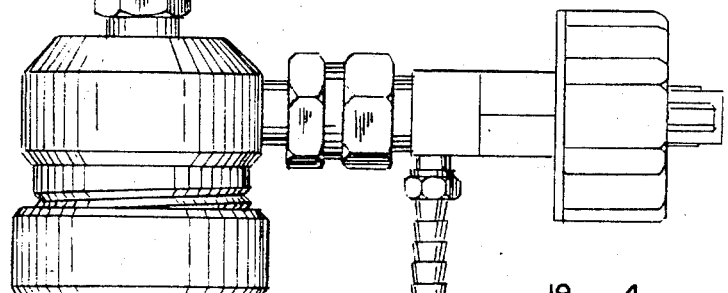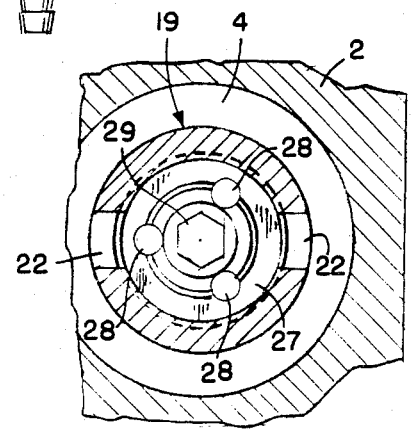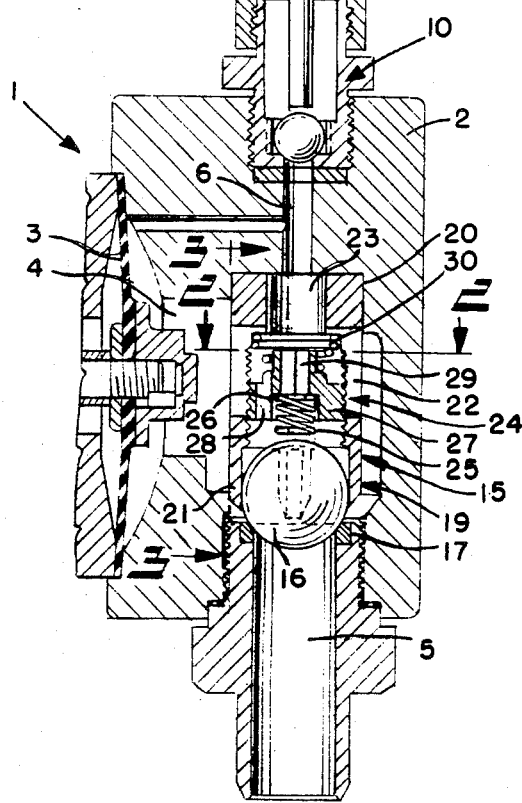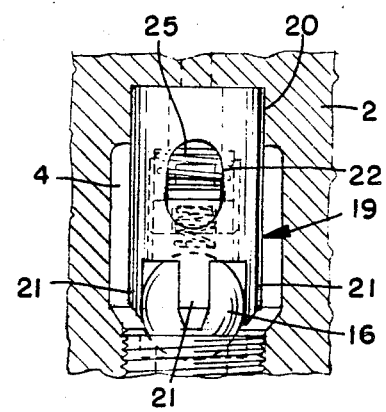

INLET VALVE ASSEMBLY FOR PAINT SPRAYER

BACKGROUND OF THE INVENTION

This invention generally relates to an inlet valve assembly for controlling the flow of fluid into a chamber, particularly a pumping chamber of a paint sprayer, which allows for accurate adjustment of valve travel in order to minimize the back flow through the inlet valve.

One common type of paint sprayer utilizes a diaphragm pump to draw paint or other fluid through an inlet valve into the pumping chamber and deliver same under pressure through an outlet valve to a sprayer gun or the like. In order to obtain optimum volumetric efficiency in such a pump, the back flow through the inlet and outlet valves must be minimized.

The present invention is concerned with minimizing back flow through the inlet valve, which must be free to open by the vacuum generated by the diaphragm movement on the inlet stroke and be slammed shut at the start of the pressure stroke.

Heretofore, the back flow through the inlet valve was minimized by providing a fixed stop to limit valve travel. However, accurate location of the fixed stop was made difficult because of tolerance problems and the like. Also, the use of such a fixed stop to limit valve travel had the further objection that the amount of inlet valve travel could not readily be adjusted in order to obtain the desired pump flow for different types of paints and other fluids to be pumped.

SUMMARY OF THE INVENTION

The present invention overcomes the aforementioned drawbacks by providing an adjustable inlet valve stop which is adjustable toward and away from the inlet valve seat to reduce or increase the amount of inlet valve movement.

In accordance with one aspect of the present invention, the inlet valve stop includes a rebound spring and a holder therefor which is threadedly received in a bore in coaxial alignment with inlet valve seat, whereby rotation of the holder in opposite directions will cause the holder and thus the spring to move toward and away from the inlet valve to respectively reduce and increase the amount of movement of the inlet valve during opening and closing of the inlet valve.

Also in accordance with the invention, the holder may have a non-circular hole or recess in the center to enable the user to insert an Allen wrench or the like in the hole to turn the holder to the desired adjusted position. Access to the adjustable stop for turning the holder may be obtained by inserting the Allen wrench through an outlet valve opening in the pump head upon removal of the outlet valve assembly therefrom. Following such adjustment, the outlet valve assembly may be reassembled in the outlet valve opening to complete the assembly.

Further in accordance with the invention, a conical lock spring may be used to frictionally retain the holder in the desired adjusted position.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a fragmentary longitudinal section through one form of sprayer pump incorporating a preferred form of inlet valve assembly in accordance with this invention;

FIG. 2 is an enlarged transverse section through the inlet valve assembly of FIG. 1 taken generally on the plane of the line 2—2 thereof;

FIG. 3 is an enlarged fragmentary side elevation view of the inlet valve assembly of FIG. 1 as seen from the plane of the line 3—3 thereof.

DETAILED DESCRIPTION OF THE PREFERRED EMBODIMENT

Figure 4:
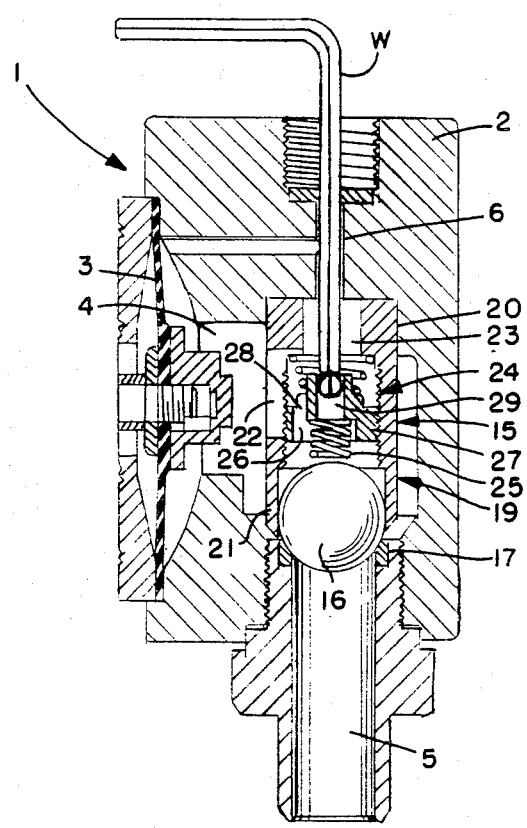
FIG. 4 is a fragmentary longitudinal section through the sprayer pump similar to FIG. 1, but showing the outlet valve assembly removed and an Allen wrench inserted through the outlet valve opening for engagement with the inlet valve stop for adjusting the location thereof.

Referring now in detail to the drawings, and initially to FIG. 1, there is shown by way of example one form of paint sprayer 1 including a paint head or body 2 having a diaphragm pump 3 associated therewith for producing a partial vacuum within a pumping chamber 4 in the paint head during movement on the inlet stroke, causing paint or other fluid being pumped to be drawn into the pumping chamber through an inlet opening 5 in the paint head, and for discharging the fluid therefrom under pressure through an outlet opening 6 on the outlet stroke.

As will be evident from FIG. 1, an outlet valve assembly 10 threadedly received within the outer end of the outlet opening 6 remains closed during the inlet stroke, and is opened by the fluid pressure generated during the outlet or pressure stroke for discharge of the pumped fluid through the outlet opening. A filter assembly 11 is shown attached to the outlet valve assembly 10 for use in filtering the paint or other fluid prior to entering a sprayer gun or the like (not shown).

Preferably, the inlet and outlet openings 5 and 6 are in direct coaxial alignment with each other on opposite sides of the pumping chamber 4 for a purpose to be subsequently described. Associated with the inlet opening 5 is a preferred form of inlet valve assembly 15 in accordance with this invention. The inlet valve assembly 15 includes the usual ball valve 16 that is kept closed against a valve seat 17 in the inlet opening by gravity until the vacuum generated by the pumping action lifts the ball valve off the seat and permits paint or other fluid to be drawn through the inlet opening into the pumping chamber. The ball valve is then forced shut against the valve seat by the fluid pressure within the pumping chamber 4 during the pressure stroke.

The inlet valve 16 may be guided during its movements toward and away from the inlet valve seat 17 by means of a ball cage 19 having one end received in a counterbore 20 in the inner wall of the pumping chamber 4 in coaxial alignment with the inlet opening 5. The ball cage has a plurality of circumferentially spaced axially extending fingers 21 at the end thereof opposite the counterbore which surround the ball valve 16 to guide the ball valve during its movements without obstructing the flow of paint or other fluid into the pumping chamber when the inlet valve 16 is open. Also, a plurality of circumferentially spaced slots 22 may be provided throughout a substantial portion of the length of the ball cage 19 as shown in FIGS. 1 and 3 to permit the flow of fluid from the pumping chamber through the slots and out through a central opening 23 in the ball cage for discharge through the outlet opening 6 during the pressure stroke.

To minimize the amount of back flow through the inlet valve assembly 15 at the start of the pressure stroke, an adjustable inlet valve stop 24 is provided interiorly within the ball cage 19 to limit the amount of ball valve travel during opening and closing movements of the inlet valve 16. To that end, the inlet valve stop 24 includes a rebound spring 25 mounted within a counterbore 26 in a spring holder 27. The depth of the counterbore 26 should be sufficient to hold the rebound spring in position so that it doesn't fall out of the holder.

Both the interior wall of the ball cage 19 and exterior of the spring holder 27 are desirably threaded for threaded engagement with each other, whereby rotation of the spring holder in opposite directions relative to the ball cage will cause the spring holder and thus the spring to move toward or away from the valve seat 17 to respectively reduce or increase the permissible amount of inlet valve movement. Typically, the spring holder 27 is positioned so that when the ball valve 16 is seated as shown in FIGS. 1 and 4, there is a clearance space of approximately 0.030 inch between the ball valve and spring, thus allowing approximately 0.030 inch of free travel of the ball valve before it contacts the spring during opening of the valve. The spring 25 is preferably a medium rate spring having a spring rate, for example, of approximately 16 lbs/in. Accordingly, when the valve is fully open, the spring will only be compressed a slight amount, for example, approximately 1/64 inch. Such ball valve travel generally produces the maximum vacuum reading. In the usual case, the higher the vacuum, the better the pump will perform. However, if the pump is used to pump a very thick or viscous paint, the inlet valve stop should desirably be adjusted to increase the free travel of the ball valve somewhat to permit a greater fluid flow into the pumping chamber, since the normal inlet valve travel may choke off the flow of a more viscous paint.

In the preferred form of inlet valve assembly 15 disclosed herein, the adjustable stop holder 27 has a plurality of circumferentially spaced axially extending flow passages 28 therethrough (see FIGS. 1 and 2) so as not to obstruct the flow of fluid centrally through the inlet valve assembly. Also, a non-circular hole 29 is provided through the center of the adjustable stop holder 27 to enable the user to insert an Allen wrench W or similar type tool into the hole to turn the holder. Access to the adjustable stop holder 27 for turning same may readily be obtained by removing the outlet valve assembly 10 from the outlet opening 6 so that the Allen wrench can be inserted through the outlet opening and into the non-circular hole 29 which is in coaxial alignment therewith (see FIG. 4).

To obtain the desired inlet valve stop 24 adjustment, the wrench W should be inserted through the outlet opening 6 and into the non-circular hole 29 in the adjustable stop holder 27 until the ball hex end of the wrench bottoms out in the adjustable stop. Then the wrench should be turned in the direction that will cause the rebound spring 25 to bottom out on the inlet ball valve 16, using caution to make certain that the adjustable stop is not over-tightened. Thereafter the wrench should be turned in the reverse direction a prescribed number of turns, for example, two and one-half turns, to back the stop off to the desired extent so that there is an initial clearance of approximately 0.030 inch between the spring 25 and inlet ball valve for maximum pump performance. However, it should be understood that because the inlet ball valve travel affects performance, slightly more or less turns of the adjustable stop may be required for increasing or decreasing the initial clearance between the spring 25 and inlet ball valve in order to obtain maximum performance when pumping fluids of different viscosity.

To retain the spring holder 27 in the desired adjusted position, a conical lock spring 30 is desirably interposed between opposed surfaces on the ball cage 19 and spring holder. The conical lock spring is desirably suitably attached to the top of the spring holder and is held tight within the ball cage to frictionally lock the spring holder in place except when a sufficiently high turning torque is applied to the spring holder by the wrench W to overcome the frictional force of the conical lock spring.

From the foregoing, it will now be apparent that the inlet valve assembly of the present invention provides for easy adjustment of the inlet valve stop toward and away from the valve seat to reduce or increase the amount of inlet valve movement to aid in minimizing the back flow through the inlet valve.

Although the invention has been shown and described with respect to a certain preferred embodiment, it is obvious that equivalent alterations and modifications will occur to others skilled in the art upon the reading and understanding of the specification. The present invention includes all such equivalent alterations and modifications and is limited only by the scope of the claims.

I claim:

1. An inlet valve assembly for a paint sprayer or the like having a pumping chamber and inlet and outlet openings through which fluid is respectively drawn into the pumping chamber and discharged therefrom, said inlet valve assembly comprising a valve seat in said inlet opening, an inlet valve movable toward and away from said valve seat for respectively closing and opening said inlet opening, and adjustable stop means engageable by said inlet valve during opening of said inlet valve to limit travel of said inlet valve, said adjustable stop means being movable toward and away from said valve seat for respectively reducing and increasing the amount of movement of said inlet valve between the open and closed positions, said adjustable stop means being threadedly mounted whereby rotation of said adjustable stop means in opposite directions will cause said stop means to move toward and away from said valve seat, said stop means being in coaxial alignment with said outlet opening and having a central non-circular opening therein which is accessible by means of a tool inserted through said outlet opening to facilitate turning of said stop means.

2. An inlet valve assembly for a paint sprayer or the like having a pumping chamber and inlet and outlet openings through which fluid is respectively drawn into the pumping chamber and discharged therefrom, said inlet valve assembly comprising a valve seat in said inlet opening, an inlet valve movable toward and away from said valve seat for respectively closing and opening said inlet opening, and adjustable stop means engageable by said inlet valve during opening of said inlet valve to limit travel of said inlet valve, said adjustable stop means being movable toward and away from said valve seat for respectively reducing and increasing the amount of said inlet valve between the open and closed positions, said adjustable stop means being threadedly mounted whereby rotation of said adjustable stop means in opposite directions will cause said stop means to move toward and away from said valve seat, said adjustable stop means including a threadedly mounted spring holder and a rebound spring extending between said holder and inlet valve, said holder having a counterbore therein for receiving a portion of said rebound spring for securing said rebound spring to said holder.

3. An inlet valve assembly for a paint sprayer or the like having a pumping chamber and inlet an outlet openings through which fluid is respectively drawn into the pumping chamber and discharged therefrom, said inlet valve assembly comprising a valve seat in said inlet opening, an inlet valve movable toward and away from said valve seat for respectively closing and opening said inlet opening, adjustable stop means engageable by said inlet valve during opening of said inlet valve to limit travel of said inlet valve, said adjustable stop means being movable toward and away from said valve seat for respectively reducing and increasing the amount of movement of said inlet valve between the open and closed positions, and cage means for guiding the movement of said inlet valve toward and away from said valve seat, said stop means being threadedly mounted in said cage means, whereby rotation of said stop means in opposite directions relative to said cage means will cause said stop means to move toward and away from said valve seat.

4. The inlet valve assembly of claim 3 wherein said inlet and outlet openings are in coaxial alignment on opposite sides of said pumping chamber, and said cage means extends coaxially from the side of said pumping chamber through which said outlet opening extends towards said inlet opening.

5. The inlet valve assembly of claim 4 wherein said cage means has a plurality of circumferentially spaced axially extending fingers surrounding said inlet valve for guiding said inlet valve during movement toward and away from said valve seat without obstructing the flow of fluid into said pumping chamber when said inlet valve is out of engagement with said valve seat, a central opening in fluid communication with said outlet opening, and a plurality of circumferentially spaced slots through said cage means intermediate the length thereof to permit fluid flow from said pumping chamber through said slots and central opening and out through said outlet opening.

6. The inlet valve assembly of claim 5 wherein said stop means has a plurality of circumferentially spaced axially extending passages therethrough so as not to obstruct the flow of fluid centrally through said cage means.

7. A sprayer pump for a paint sprayer or the like comprising a pumping chamber having inlet and outlet openings, means for drawing fluid into said pumping chamber through said inlet opening and for discharging such fluid from said pumping chamber under pressure through said outlet opening, and inlet and outlet valve assemblies for respectively controlling the flow of fluid into said pumping chamber through said inlet opening and out through said outlet opening, said inlet valve assembly comprising a valve seat within said inlet opening, an inlet valve movable toward and away from said valve seat for respectively closing and opening said inlet opening, and adjustable stop means engageable by said inlet valve during opening of said inlet valve to limit the travel of said inlet valve away from said valve seat, said adjustable stop means being movable toward and away from said valve seat for respectively reducing and increasing the amount of travel of said inlet valve between the open and closed positions, said adjustable stop means including a spring holder threadedly mounted within said pumping chamber and a rebound spring carried by said holder, whereby rotation of said holder in opposite directions will cause said rebound spring to move toward and away from said valve seat for varying the amount of free travel of said inlet valve before said inlet valve engages said rebound spring during opening of said inlet valve.

8. The sprayer pump of claim 7 wherein said holder has a central non-circular opening therein to facilitate turning of said holder by insertion of a rotatable tool into said non-circular opening.

9. The sprayer pump of claim 8 wherein said adjustable stop means and inlet and outlet openings are in coaxial alignment with each other, and said outlet valve assembly is removable from said outlet opening to facilitate insertion of such turning tool through said outlet opening into said non-circular opening in said holder for turning same.

10. The sprayer pump of claim 7 further comprising cage means for guiding the movement of said inlet valve toward and away from said valve seat, said holder being threadedly mounted in said cage means, whereby rotation of said holder in opposite directions relative to said cage means will cause said adjustable stop means to move toward and away from said valve seat.

11. THe sprayer pump of claim 10 wherein said inlet and outlet openings are in coaxial alignment on opposite sides of said pumping chamber, and said cage means extends coaxially from the side of said pumping chamber through which said outlet opening extends toward said inlet opening, said holder having a central non-circular opening therein to facilitate turning of said holder by means of a turning tool inserted into said non-circular hole, said outlet valve assembly being removable from said outlet opening to facilitate insertion of such turning tool through said outlet opening into said non-circular opening in said holder.

12. The sprayer pump of claim 10 further comprising retaining means for frictionally retaining said holder against movement relative to said cage means.

13. The sprayer pump of claim 12 wherein said retaining means comprises a conical lock spring extending coaxially between opposed surfaces on said cage means and holder to resist turning of said holder.

14. The sprayer pump of claim 10 wherein said holder has a counterbore therein for receiving a portion of said rebound spring to retain said rebound spring for movement with said holder.

15. An inlet valve assembly for a paint sprayer or the like having a pumping chamber and inlet and outlet openings through which fluid is respectively drawn into the pumping chamber and discharged therefrom, said inlet valve assembly comprising a valve seat in said inlet opening, an inlet valve movable toward and away from said valve seat for respectively closing and opening said inlet opening, and adjustable stop means engageable by said inlet valve during opening of said inlet valve to limit travel of said inlet valve, said adjustable stop means being movable toward and away from said valve seat for respectively reducing and increasing the amount of movement of said inlet valve between the open and closed positions, said adjustable stop means including a threadedly mounted spring holder and a rebound spring carried by said holder, whereby rotation of said holder in opposite directions will cause said rebound spring to move toward and away from said valve seat for varying the amount of free travel of said inlet valve before said inlet valve engages said rebound spring during opening of said inlet valve.

16. The inlet valve assembly of claim 15 further comprising retaining means for retaining said holder in the desired adjusted position.

17. The inlet valve assembly of claim 16 wherein said retaining means comprises a conical lock spring engageable with said holder to resist turning of said holder.

* * * * *